May 31, 1932. M. POSER 1,860,430
MICROSCOPE ILLUMINATING MEANS
Filed Aug. 20, 1930
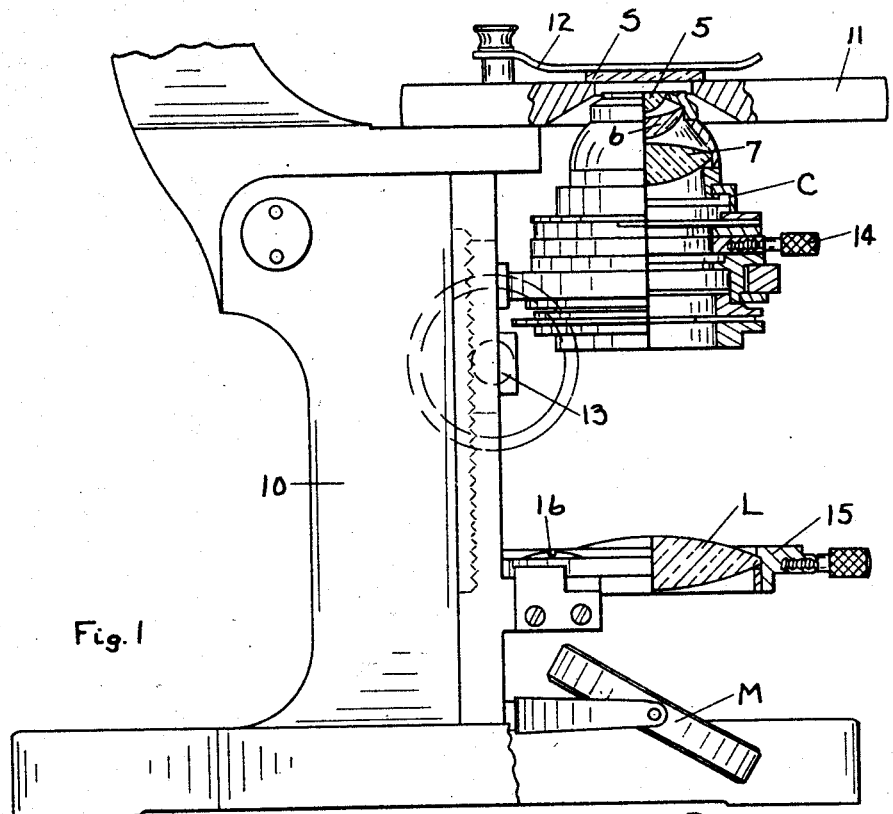
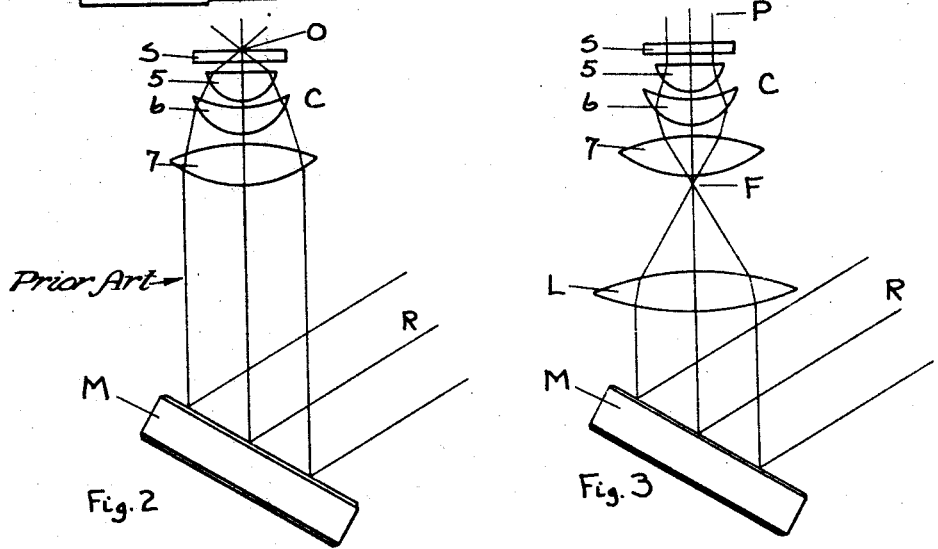
MAX POSER
*INVENTOR*
BY *J. A. Tollestad*
*ATTORNEY*

Patented May 31, 1932

1,860,430

UNITED STATES PATENT OFFICE

MAX POSER, OF ROCHESTER, NEW YORK, ASSIGNOR TO BAUSCH & LOMB OPTICAL COMPANY, OF ROCHESTER, NEW YORK, A CORPORATION OF NEW YORK

MICROSCOPE ILLUMINATING MEANS

Application filed August 20, 1930. Serial No. 476,575.

This invention relates to microscopes and more particularly it has reference to means for illuminating an object which is under observation on the stage of a microscope.

When using a microscope with the higher power objectives, such as those having a focal length of 1.9 mm. or 4 mm., for example, it is necessary, in order to secure efficient illumination, to employ a corrected substage condenser having a sufficiently large numerical aperture. To secure proper illumination it is necessary that such a condenser be carefully focused and centered and these operations are quite tedious and time consuming. Condensers of this type are often used with a suitable immersion fluid between the top lens of the condenser and the bottom face of the microscope object slide. When such a condenser is used with a high power objective, critical illumination of the object is secured by directing parallel light rays, from an arc lamp and condenser, for example, into the substage condenser and adjusting it so that an image of the light source is formed at the object plane. This illuminates the relatively small field of a high power objective but does not properly illuminate the relatively large field of a low power objective such as one having a focal length of 16 mm. or 32 mm., for example.

Low power objectives are used for searching the object field areas and once a certain part of the object has been located it is often necessary to view it under a greater magnification. Such a change of magnification can be effected conveniently, as far as the objectives are concerned, by means of the well known rotatable nose piece or the like. The necessary accompanying change of illumination cannot, as far as I am aware, be as conveniently effected by the prevailing prior art methods. Thus, to illuminate a large field for low power work it is necessary to either rack the high power condenser downwardly or remove the top lens or lenses of the high power condenser. The former procedure, however, gives incorrect and improper illumination. Such operations throw the condenser out of adjustment so that the laborious and painstaking adjustments must again be made when it is desired to change from the low power to the high power objective.

One of the objects of my invention is to provide an improved illuminating means for a microscope. Another object is to provide means whereby changes in illumination of objects on a microscope stage can be conveniently and instantly made for accompanying changes in the powers of the objectives. Still another object is to provide auxiliary lens means which can be selectively used with a substage condenser to provide illumination for low power objectives without disturbing the high power condenser after it has been adjusted for use with high power objectives. Other objects and advantages reside in certain novel features of construction, arrangement and combination of parts as will hereinafter be more fully described and pointed out in the appended claims.

Referring to the drawings:

Fig. 1 shows a fragmentary view of a microscope embodying my invention, with parts in section.

Fig. 2 is a diagrammatic view showing the operation of a well known high power condenser.

Fig. 3 is a diagrammatic view showing the operation of my improved illuminating means.

One embodiment of my invention is shown in the drawings wherein 10 indicates a microscope stand on which is mounted the stage 11 having spring fingers 12 for holding the object slide S. Mounted on stand 10 is the aplanatic substage condenser which is indicated generally at C and comprises the lens elements 5, 6 and 7. The condenser can be raised and lowered for focusing by means of rack and pinion 13 and centering adjustments are made by means of screw 14. Pivotally mounted on the stand 10 is the substage mirror M which is adapted to reflect light rays from a suitable source, up into the condenser C. A converging lens L is carried by a mounting 15 which is pivotally mounted as at 16 on a bracket which is integral with stand 10 so that the lens L may be selectively moved into or out of optical alignment with the condenser C.

The operation of my improved device can best be understood by referring to Figs. 2 and 3. The former figure shows the optical performance of a well known type of aplanatic condenser wherein parallel light rays R, coming from a suitable source such as an arc lamp and condenser, are reflected by mirror M into the condenser and then brought to a focus so that an image of the light source is produced at the object O and critical illumination is obtained. Such a method will properly illuminate the relatively small field of a high power objective but will not provide the proper illumination for the relatively large field of a low power objective.

A microscopist generally uses a low power objective for searching a relatively large field and when a certain part of the object has been located it is necessary to quickly change to a higher power objective so that the desired part of the object may be viewed under greater magnification. Or, while using a high power objective, it may be desired to change temporarily to a low power for orientation purposes and then back to the high power. The necessary change of objectives can, of course, be conveniently effected by means of a rotatable objective holder or nose piece, as is well known to those skilled in the art. Under the prior arts methods, however, the necessary accompanying change of illumination cannot, as far as I am aware, be effected in a rapid and convenient manner. Under the prevailing practices, proper illumination for low power observation is obtained by either removing the two top lenses of the condenser or by using a special low power, long focus condenser. Either one of these methods is inconvenient, especially when the top lens of the high power condenser is in immersion contact with the under side of the object slide, as is often the case. Furthermore, such methods disturb the delicate adjustment of the illuminating system so that when it is desired to use a high power objective again, it is necessary to go through the painstaking operation of re-adjusting the condenser.

By means of my invention, however, I am able to provide a convenient means for quickly changing from one type of illumination to another without disturbing the adjustment of the illuminating system. This is accomplished by the use of a swingably mounted converging lens L which may be selectively positioned between the condenser C and the mirror M, as shown in Fig. 3. Parallel light rays R, from a suitable source such as a lamp and condenser, are reflected upwardly by mirror M to the lens L which forms an image of the light source in the back focal plane F of the condenser C. The condenser acts as a collimating objective and sends out from its upper lens 5 a beam of substantially parallel light rays P. The diameter of this beam is substantially the same as the top surface of lens 5 and this provides proper and ample illumination to cover the field of a relatively low power objective having a focal length of 16 mm. or even 32 mm. To provide critical illumination for a high power objective it is merely necessary to swing the lens L out of the path of the rays so that the condenser C functions as shown in Fig. 2.

From the foregoing it will be apparent that I am able to attain the objects of my invention and provide means whereby changes of illumination for use with high or low power objectives can be conveniently and quickly made without disturbing the adjustment of the high power condenser. The advantages and convenience of my improved device will be readily appreciated by microscopists, such as research workers, cytologists etc., for example, who frequently find it necessary to change the type of illumination concurrently with a change of objectives. Various modifications can obviously be made without departing from the spirit of my invention as pointed out in the appended claims.

I claim:

1. A microscope comprising in combination a stand having a stage, a condenser mounted beneath said stage, lens means movably mounted on said stand beneath said condenser and adapted to be selectively positioned in alignment with the condenser, the principal focus of said lens means being located substantially in the back focal plane of said condenser.

2. An illuminating device for a microscope comprising a stand carrying a stage, a condenser mounted on the stand below said stage, a reflector for directing light rays into said condenser and a double convex lens swingably mounted on said stand and adapted to be selectively positioned between said reflector and condenser.

3. In a microscope, the combination of a stand, a condenser mounted on the stand, means for directing parallel light rays into said condenser, and converging lens means movably mounted on said stand and adapted to be selectively positioned below said condenser in the path of the parallel light rays whereby said light rays will be substantially parallel when they emerge from the upper side of the condenser.

4. In a microscope, the combination of a stand carrying a stage, a condenser mounted on said stand below the stage, a reflector below said condenser for directing parallel light rays from a light source into said condenser and a positive lens element movably mounted on said stand and adapted to be selectively positioned between said condenser and reflector to form an image of the light source in the back focal plane of said condenser.

5. In a microscope, the combination of a support carrying a stage, a condenser mounted beneath said stage, a light source emitting parallel light rays, reflecting means positioned below said condenser for directing parallel rays into the condenser, and movably mounted lens means carried by said stand and adapted to be selectively positioned between said reflecting means and said condenser, said lens being designed to form an image of said light source in the back focal point of said condenser.

6. A microscope comprising in combination a stand carrying a substage condenser having an upper focal point, and a lens swingably mounted on said stand beneath said condenser, said lens cooperating with said condenser to raise the upper focal point of said condenser.

7. An illuminating device for a microscope comprising a stand carrying a stage, a condenser mounted on said stand beneath said stage, a reflector for directing light rays into said condenser and a converging lens movably mounted on said stand below said condenser and adapted to be selectively positioned between said reflector and condenser.

8. A microscope having in combination a stand carrying a stage, a condenser mounted on said stand beneath said stage, said condenser having an upper focal point and means for causing light rays which pass through said condenser to be brought to a focus at a point which is above said upper focal point, said means comprising a lens which is movably mounted on said stand below said condenser and adapted to be selectively positioned in cooperative alignment with said condenser.

9. A microscope having in combination a stand, a substage condenser mounted on said stand, light-converging means movably mounted on said stand below said condenser, said means being movable into and out of cooperative relationship with said condenser said means being adapted and constructed to focus light rays substantially at the back focal point of said condenser when said means is in operative position.

MAX POSER.